United States Patent
Hong

(10) Patent No.: US 9,492,976 B2
(45) Date of Patent: Nov. 15, 2016

(54) SEALANT BOTTLE FOR TIRE REPAIR OF VEHICLE

(71) Applicant: Active Tools International (HK) Ltd., Causeway Bay (HK)

(72) Inventor: David Ying Chi Hong, Causeway Bay (HK)

(73) Assignee: Active Tools International (HK) Ltd., Causeway Bay (HK)

( * ) Notice: Subject to any disclaimer, the term of this patent is extended or adjusted under 35 U.S.C. 154(b) by 0 days.

(21) Appl. No.: 13/653,833

(22) Filed: Oct. 17, 2012

(65) Prior Publication Data

US 2014/0103006 A1     Apr. 17, 2014

(51) Int. Cl.
*B65D 83/14*     (2006.01)
*B29C 73/16*     (2006.01)

(52) U.S. Cl.
CPC .................................. *B29C 73/166* (2013.01)

(58) Field of Classification Search
CPC . B29L 2030/00; A61J 11/002; B29C 73/166
USPC ................ 222/402.13, 547, 109, 464.4, 500, 222/464.1, 464.3, 153.11, 182, 402.11, 373, 222/394, 464.6, 402.1, 402.12; 215/272; 141/38
See application file for complete search history.

(56) References Cited

U.S. PATENT DOCUMENTS

| | | | | | |
|---|---|---|---|---|---|
| 2,156,606 | A | * | 5/1939 | Robertshaw | 222/373 |
| 2,159,656 | A | * | 5/1939 | Foucht | 123/196 M |
| 2,294,858 | A | * | 9/1942 | Allen | 222/464.1 |
| 2,314,273 | A | * | 3/1943 | Gunderson | 222/67 |
| 2,796,294 | A | * | 6/1957 | McKinnon | 239/327 |
| 3,044,650 | A | * | 7/1962 | Oltion et al. | 215/11.1 |
| 3,221,945 | A | * | 12/1965 | Davis, Jr. | 222/633 |
| 3,242,474 | A | * | 3/1966 | Karasinski, Jr. et al. | 222/51 |
| 4,273,272 | A | * | 6/1981 | Blanc | 222/464.4 |
| 4,371,098 | A | * | 2/1983 | Nozawa et al. | 222/321.4 |
| 4,728,011 | A | * | 3/1988 | Schuster et al. | 222/439 |

(Continued)

FOREIGN PATENT DOCUMENTS

DE     10106468 A1     8/2002
EP      1815970 A2     8/2007

(Continued)

OTHER PUBLICATIONS

Extended European Search Report issued in the corresponding European application No. 12883734.1, Jun. 13, 2016, 3 pages.

*Primary Examiner* — Paul R Durand
*Assistant Examiner* — Charles P Cheyney
(74) *Attorney, Agent, or Firm* — Raymond R. Ferrera; Adams and Reese LLP

(57) ABSTRACT

The present invention relates to a tire repair tool and further discloses a sealant bottle for tire repair of vehicle. The sealant bottle comprises a bottle body for holding sealant and a sealant hose arranged within the bottle body. The sealant within the bottle body is led out by combination of the sealant hose and a connection tube of sealant bottle. The sealant hose is connected with a one-way valve at one end. The one-way valve includes a valve body, a sealing plug and a valve cover, while the valve cover is arranged at one end of the valve body. The one-way valve is arranged with a gravitational shell which surrounds the one-way valve. In the present invention, it is possible to make full use of the sealant inside the sealant body by virtue of the gravitational shell. Besides, the sealant bottle is easy in structure and convenient in usage.

9 Claims, 3 Drawing Sheets

(56) References Cited

U.S. PATENT DOCUMENTS

| | | | |
|---|---|---|---|
| 4,832,237 A * | 5/1989 | Hurford, Jr. | 222/464.1 |
| 4,944,429 A * | 7/1990 | Bishop et al. | 222/153.13 |
| 5,110,013 A * | 5/1992 | Clark et al. | 222/382 |
| 5,195,664 A * | 3/1993 | Rhea | 222/464.4 |
| 5,269,444 A * | 12/1993 | Wright | 222/190 |
| 5,722,350 A * | 3/1998 | Marshall | 119/673 |
| 7,296,590 B2 * | 11/2007 | Kitagawa | 137/399 |
| 7,350,673 B2 * | 4/2008 | Glynn et al. | 222/205 |
| 8,020,588 B2 * | 9/2011 | Wang | 141/38 |
| 8,205,645 B2 * | 6/2012 | Dowel | 141/38 |
| 8,720,745 B2 * | 5/2014 | Bentchev et al. | 222/153.01 |
| 2001/0037990 A1 * | 11/2001 | Pous | 215/272 |
| 2007/0181209 A1 * | 8/2007 | Stehle | 141/38 |
| 2007/0205224 A1 * | 9/2007 | Glynn et al. | 222/211 |
| 2009/0107578 A1 * | 4/2009 | Trachtenberg et al. | 141/5 |
| 2009/0277534 A1 * | 11/2009 | Yoshida et al. | 141/38 |
| 2010/0071801 A1 * | 3/2010 | Sekiguchi | 141/38 |
| 2011/0155280 A1 * | 6/2011 | Eckhardt | 141/38 |

FOREIGN PATENT DOCUMENTS

| | | |
|---|---|---|
| JP | 200219862 A | 1/2002 |
| WO | 2009/052576 A1 | 4/2009 |

* cited by examiner

SEALANT BOTTLE FOR TIRE REPAIR OF VEHICLE

FIELD OF THE INVENTION

The present invention relates to a tyre repair tool of vehicle. More specifically, the present invention relations to a sealant bottle for tyre repair of vehicle.

BACKGROUND OF THE INVENTION

In the prior art, sealant in the sealant bottle is often pressed into a tyre under the action of the air produced by an air compressor in the process of tyre repair. After that, in order to achieve the tyre repair, the sealant can cover the inner wall of the tyre evenly while the vehicle is forwarding slowly. However, since the sealant hose inside the sealant bottle is commonly the one with smaller specific gravity, when the sealant bottle is positioned horizontally, the sealant therein cannot be fully utilized frequently. Regarding this problem, if some materials with greater specific gravity are used to make the sealant hose, its hardness is also enhanced simultaneously, in which case the sealant hose cannot bend flexibly inside the sealant bottle, whereby the sealant at the bottom side of the bottle body cannot be utilized fully either.

SUMMARY OF THE INVENTION

The objective of the present invention is to provide a sealant bottle for tyre repair of vehicle of which the sealant hose can bend flexibly inside the bottle body and abut against the bottom side of the bottle body all the time, aiming at the problems that the sealant inside the bottle cannot be fully utilized when the sealant bottle is positioned horizontally in the prior art.

According to an aspect of the present invention, a sealant bottle for tyre repair of vehicle is provided, which comprises a bottle body for holding sealant and a sealant hose arranged within the bottle body. A first bottle cap and a second bottle cap are disposed at an opening for outputting sealant of the bottle body, wherein the first bottle cap completely surrounds the second bottle cap, and the latter can slide within the former. The sealant within the bottle body is led out by combination of the sealant hose and a connection tube of sealant bottle passing through the second bottle cap.

The sealant hose is connected with a one-way valve at its one end. The one-way valve includes a valve body, a sealing plug and a valve cover, while the valve cover is arranged at one end of the valve body that is far away from the sealant hose. The valve body is arranged with a channel and a groove for guiding the sealant inside, wherein the latter connected to the channel is arranged at one end of the channel that is far away from the valve cover. Herein, the sealing plug is arranged in the channel and it can move therein along the axial direction of the bottle body. The one-way valve is arranged with a gravitational shell which surrounds the one-way valve.

In the above-mentioned sealant bottle for tyre repair of vehicle, the connection tube of sealant bottle is comprised of a second tube section arranged along the axial direction of the bottle body and a first tube section perpendicular to the second tube section. The second tube section passes through the second bottle cap and further connects with the sealant hose.

In the above-mentioned sealant bottle for tyre repair of vehicle, the second tube section of the connection tube of sealant bottle is provided with a retaining ring for preventing the connection tube of sealant bottle from loosening towards the outside of the bottle body in the sliding process.

In the above-mentioned sealant bottle for tyre repair of vehicle, the second bottle cap comprises a bottle cap body and a central channel arranged at the centre of the bottle cap body.

In the above-mentioned sealant bottle for tyre repair of vehicle, the central channel is inserted into the opening for outputting sealant of the bottle body. The inner surface of the bottle cap body is provided with internal threads, while the opening for outputting sealant of the bottle body is provided with external threads; wherein the internal threads are matched and connected with the external threads.

In the above-mentioned sealant bottle for tyre repair of vehicle, the gravitational shell is in threaded connection with the one-way valve.

In the above-mentioned sealant bottle for tyre repair of vehicle, the gravitational shell is connected with the sealant hose by a joint nozzle protruding from the end of the gravitational shell.

In the above-mentioned sealant bottle for tyre repair of vehicle, the inner diameter of the channel of the valve body is equal to the outer diameter of the sealing plug.

In the above-mentioned sealant bottle for tyre repair of vehicle, an end plate of the valve cover is provided with three projections. These projections are inserted into the corresponding slots at one end of the valve body that is far away from the sealant hose, so that the valve cover is connected with the valve body.

In the above-mentioned sealant bottle for tyre repair of vehicle, the bottle body also comprises an air inlet end. An opening for inputting air at the air inlet end of the bottle body is provided with a bottle stopper, while a sealing washer is further arranged between the bottle stopper and the opening for inputting air so as to prevent the leakage of the sealant.

When implementing the sealant bottle for tyre repair of vehicle of the present invention, the following advantageous effects can be obtained: the first bottle cap at the opening for outputting sealant of the bottle body is connected with the connection tube of sealant bottle, in which case the first bottle cap and the connection tube of sealant bottle can be turned collectively without turning the bottle body during the usage of the sealant bottle, thereby achieving a retractable application of the first bottle cap. Since the gravitational shell arranged at the end of the sealant hose has greater specific gravity, no matter the sealant bottle is positioned horizontally or vertically, the sealant hose can bend flexibly inside the bottle body and its end abuts against the bottom side of the bottle body all the time, so that the sealant inside the bottle body can be fully utilized. In the present invention, the one-way valve is a plug type one. It can be feedthrough smoothly for outputting the sealant under the action of air pressure, while it can seal the sealant hose very well so as to prevent the leakage of the sealant when it is unneeded to use the sealant bottle. All in all, the sealant bottle for tyre repair of the present invention is simple in structure, convenient in usage and capable of achieving a full utilization of the sealant therein.

BRIEF DESCRIPTION OF THE DRAWINGS

The present invention will be further illustrated in detail with reference to accompanying drawings and specific embodiments. In the figures.

DETAILED DESCRIPTION OF THE PREFERRED EMBODIMENT

Figure 1:
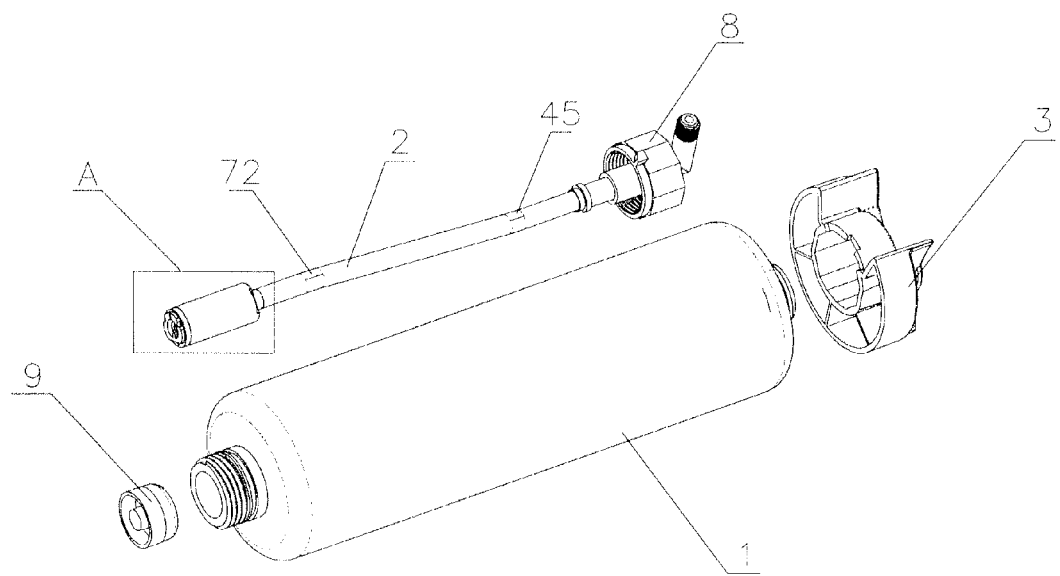
FIG. 1 is a structural diagram for a sealant bottle for tyre repair of the present invention.

Referring to FIGS. 1-6, FIG. 1 is a structural diagram for a sealant bottle for tyre repair provided in the present invention. In the present invention, the sealant bottle for tyre repair of vehicle comprises a bottle body 1 for holding sealant and a sealant hose 2 arranged within the bottle body 1. A first bottle cap 3 and a second bottle cap 8 are disposed at an opening for outputting sealant of the bottle body 1, wherein the first bottle cap 3 completely surrounds the second bottle cap 8. The sealant within the bottle body 1 is led out by combination of the sealant hose 2 and a connection tube of sealant bottle passing through the second bottle cap 8. The sealant hose 2 is connected with a one-way valve at one end. The one-way valve includes a valve body 51, a sealing plug 53 and a valve cover 52, while the valve cover 52 is arranged at one end of the valve body 51 that is far away from the sealant hose 2. The valve body 51 is arranged with a channel and a groove for guiding sealant 521 inside, wherein the latter connected to the channel is arranged at one end of the channel that is far away from the valve cover 52. Herein, the sealing plug 53 is arranged in the channel and it can move therein along the axial direction of the bottle body 1. The one-way valve is arranged with a gravitational shell 7 which surrounds the one-way valve.

In addition, the bottle body 1 of the sealant bottle for tyre repair of vehicle also comprises an air inlet end in the present invention, at which an opening for inputting air is provided with a bottle stopper 9. In order to ensure a full sealing of the bottle body and to prevent the sealant from leakage in the unused state, a sealing washer is further arranged between the bottle stopper 9 and the opening for inputting air.

Figure 3:
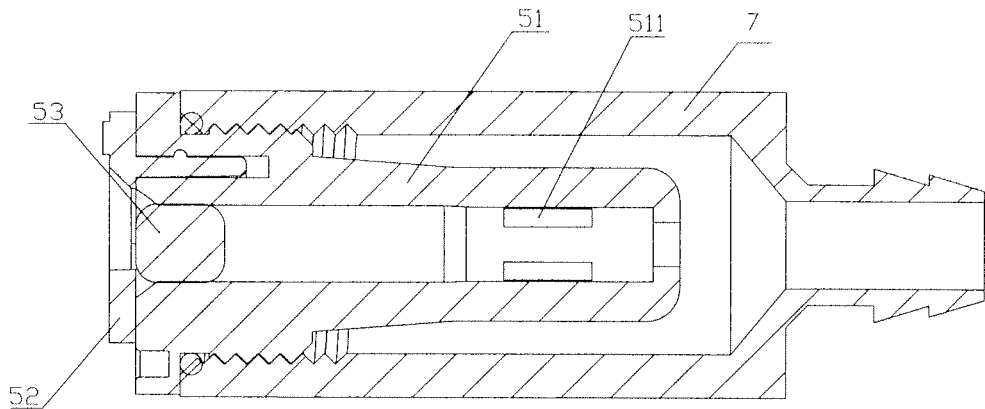
FIG. 3 is a structural diagram for a one-way valve in the present invention, wherein the one-way valve is in the state of sealing.
Figure 4:
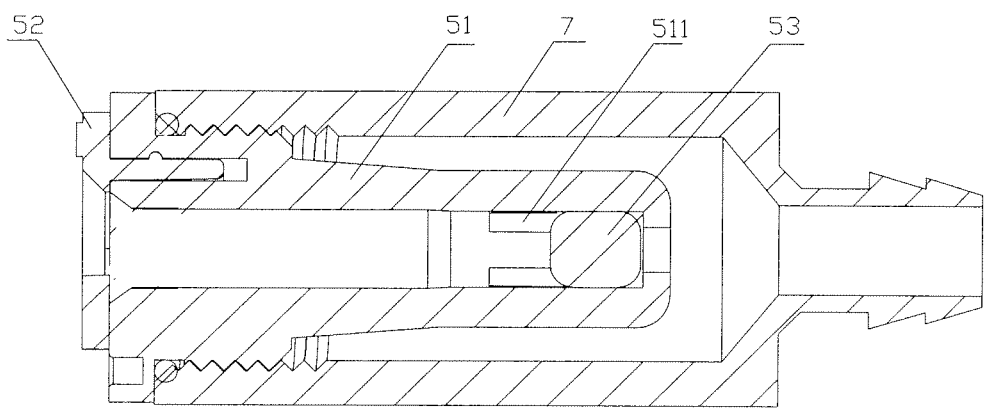
FIG. 4 is a structural diagram for a one-way valve in the present invention, wherein the one-way valve is in the state of leading out the sealant.

In the present invention, the working process by the cooperation of the sealant bottle for tyre repair and the air compressor is illustrated briefly as follows: (1) when the sealant bottle for tyre repair is unused, the bottle stopper 9 seals the air inlet end, and the sealing plug 53 abuts against the valve cover 52 to block the opening of the valve body 51 so that the bottle body 1 is sealed (FIG. 3); (2) when the air compressor is started to input some air and the pressure increases to a certain value (2-4 bar), the bottle stopper 9 will be pressed to be open so that some air will enter the bottle body 1 and lead to a high-pressure environment therein; (3) the sealing plug 53 of the one-way valve is acted upon by the high-pressure air inside the bottle body 1 to make the sealing plug 53 no longer abut against the valve cove 52; in this case, the sealant can enter the sealant hose 2 through the one-way valve and further flows out of the bottle body 1 through the connection tube of sealant bottle (FIG. 4)

Figure 2:
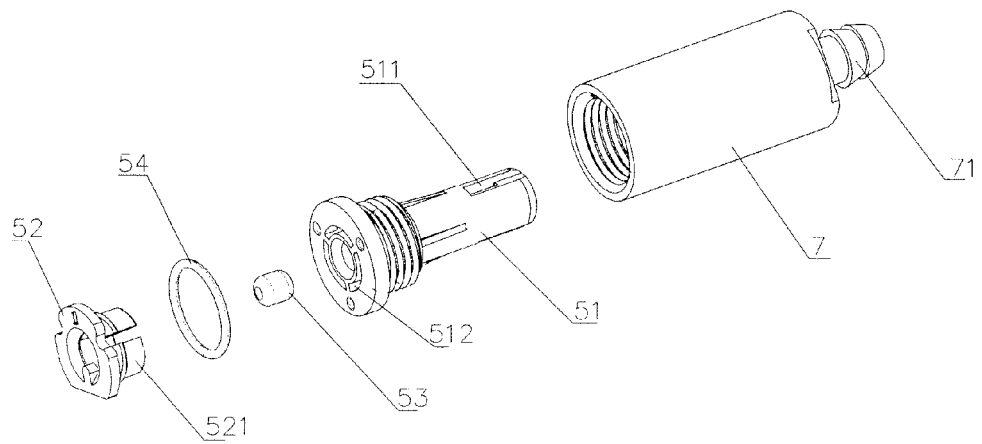
FIG. 2 is an exploded diagram for the component represented by A in FIG. 1.

The gravitational shell 7 is one of the key points of the present invention. It can be made from a variety of materials with great specific gravity, such as iron, steel and varieties of alloy. As shown in FIG. 2, the gravitational shell 9 in the present invention is a hollow structure in the shape of cylinder, and it is sheathed around the one-way valve. One end of the gravitational shell 9 is provided with threads on the inner surface, and the other end thereof is formed with a protruding joint nozzle 71. Herein, the threads are used for achieve a threaded connection with the valve body 51, and the joint nozzle 71 can be inserted into the sealant hose 2 so as to be connected with the sealant hose 2.

The purpose of the gravitational shell 7 is to increase the specific gravity of the end of the sealant hose 2. In the case that the sealant hose 2 is a flexible one, no matter how the sealant bottle for tyre repair is positioned, the end of the sealant hose 2 abuts against the bottom side of the bottle body 1 all the time so as to ensure a full utilization of the sealant inside the bottle body 1. The size of the gravitational shell 7 can be set according to actual needs. As shown in FIG. 1, the gravitational shell 7 surrounds the one-way valve completely; while in another implementation, it may only surround a part of the region of the one-way valve.

Also as shown in FIG. 2, the one-way valve comprises the valve body 51, the valve cover 52 and the sealing plug 53. An end plate of the valve cover 52 is provided with three projections 521. These projections 521 can be inserted into the corresponding slots 512 at one end of the valve body 51 that is far away from the sealant hose 2, so that the valve cover 52 is fixedly connected with the valve body 51. A sealing ring 54 is further arranged between the valve cover 52 and the valve body 51 to ensure the sealing connection between the two. Of course, the connection between the valve body 51 and the valve cover 52 is not limited to the mode shown in the figures. In another implementation, a glue mode can be adopted to connect the valve body 51 with the valve cover 52.

Further, referring to FIGS. 2-4, a channel is formed inside the valve body 51, through which the sealant can enter the sealant hose 2. In the sealing state, the sealing plug 53 is disposed at the interface between the valve body 51 and the valve cover 52, and it blocks the inlet of the channel so as to prevent the sealant from entering the channel (as shown in FIG. 3). The groove for guiding sealant 511 connected to the channel is arranged at one end of the channel that is far away from the valve cover 52. Under the action of the high-pressure air, the sealing plug 53 slides in the channel until it reaches the end that is far away from the valve cover 52 (as shown in FIG. 4). Herein the sealant can flow through the channel and the groove for guiding sealant 511 and further flow into the sealant hose 2. The inner diameter of the channel of the valve body 51 is equal to the outer diameter of the sealing plug 53, so that the sealing plug 53 can abut against the inner wall of the channel in the stationary and mobile states to ensure that the sealant will not leak out. The sealing plug 53 used in the present invention is made of rubber. It can be understood that the sealing plug can also be made of any other suitable materials.

At the same time, the arrangement of the sealing plug 53 can protect the storage of the sealant in high-temperature and low-temperature states to a certain extent. The air and the sealant inside the bottle may expand and/or contract under the influence of the high-temperature and/or low-temperature environments that the sealant bottle is arranged in, which cause a pressure change in the whole bottle. The sealing device of the sealant bottle in the prior art is very likely to be damaged for this reason, especially for those with a tinfoil or a film as the sealing device. In the sealant bottle for tyre repair of vehicle of the present invention, the channel inside the valve body 51 can provide some moving space for the sealing plug 53 so as to eliminate the pressure change caused by the expansion and/or contraction of the air and sealant in a proper way. During movement, the sealing plug 53 always abuts against the wall of the channel so as to ensure a sealing environment inside the whole sealant bottle.

Figure 5:
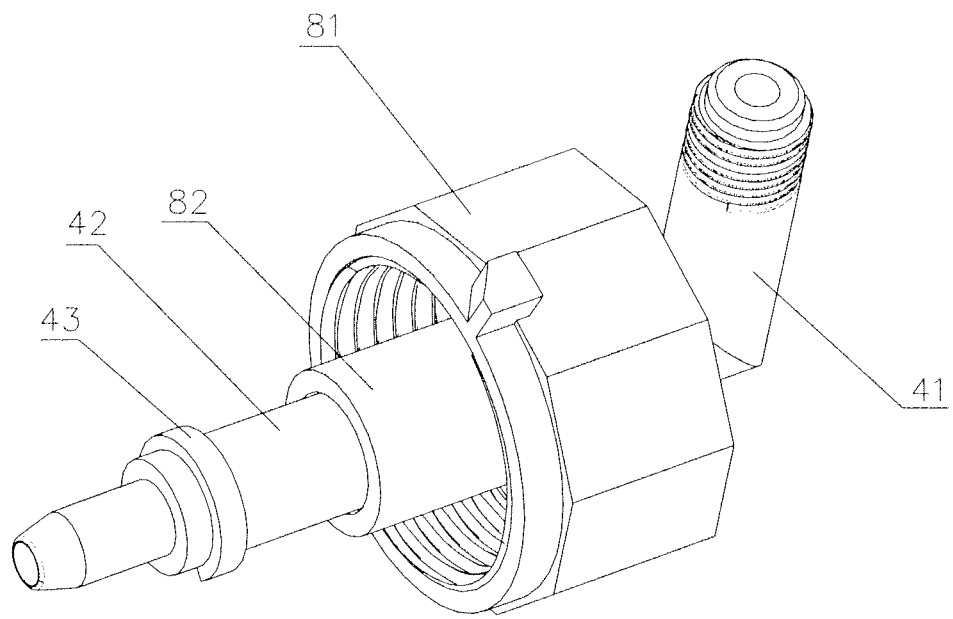
FIG. 5 is a structural diagram for a connection tube of sealant bottle that is assembled on the second bottle cap in the present invention.
Figure 6:
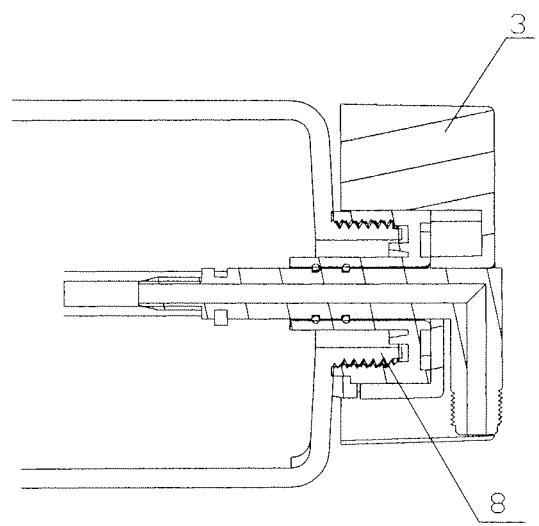
FIG. 6 is a structural diagram for an un-contracted first bottle cap in the present invention.

As shown in FIG. 5, the second bottle cap 8 comprises a bottle cap body 81 and a central channel 82 arranged at the centre of the bottle cap body 81. The central channel 82 is inserted into the opening for outputting sealant of the bottle body 1. The inner surface of the bottle cap body 81 is provided with internal threads, while the opening for outputting sealant of the bottle body 1 is provided with external threads; wherein the internal threads are matched and connected with the external threads so as to fixedly connect the second bottle cap 8 with the bottle body 1. What is different from the existing sealant bottle for tyre repair lies in that, a first bottle cap 3 cooperating with the second bottle cap 8 is further disposed at the sealant outlet end of the sealant bottle of the present invention. The two is plugged together to be connected, and the second bottle cap 8 slides in the first bottle cap 3. Through this structure, a retractable application can be achieved for the bottle caps of the sealant bottle when disassembling the used-up sealant bottle; that is, to enhance the flexibility of the disassembling operation. As shown in FIG. 6, the second bottle cap 8 is totally inserted into the first bottle cap 3 in the non-extended state. The latter hence completely surrounds the second bottle cap 8 and presses close to the bottle body. In contrast, the first bottle cap 3 can slide relative to the second bottle cap 8 in an extended state (not shown) to enlarge its distance from the bottle body 1. The connection tube of sealant bottle can be turned collectively with the first bottle cap 3.

In the above-mentioned sealant bottle for tyre repair of vehicle, the connection tube of sealant bottle is comprised of a second tube section 42 arranged along the axial direction of the bottle body 1 and a first tube section 41 perpendicular to the second tube section 42. The outer surface of the first tube section 41 is provided with external threads so as to be connected with a sealant throat pipe for guiding the sealant into a tyre. The second tube section 42 passes through the central channel 82 of the second bottle cap 8 and is formed of a joint nozzle (as shown in the figure) at the end far away from the first tube section 42 so as to be inserted into and connected with the sealant hose 2. Based on this structural arrangement, the sealant bottle of the present invention cooperates with the air compressor to from a connection path to realize an effective supply of the sealant, wherein the connection path is as follows: sealant hose-connection tube of sealant bottle-sealant throat pipe. Further referring to FIG. 5, the second tube section 42 of the connection tube of sealant bottle is provided with a retaining ring 43 for preventing the connection tube of sealant bottle from loosening outwards in the sliding process. Wherein, the outer diameter of the retaining ring is larger than the inner diameter of the central channel 82. Furthermore, a sealing ring (not shown) is arranged at the joint between the joint nozzle at the end of the second tube section 42 and the sealant hose 2, thereby preventing the sealant from leaking out during the sliding of the connection tube of sealant bottle.

What mentioned above is only the preferred embodiments of the present invention, which is not used to limit the present invention. Any modifications, equivalents and improvements made within the spirit and principle of the present invention should be included in the scope of protection of the present invention.

The invention claimed is:

1. A sealant bottle for tire repair of vehicle, comprising a bottle body (1) for holding sealant and a flexible sealant hose (2) arranged within the bottle body (1); a first bottle cap (3) and a second bottle cap (8) disposed at an opening for outputting sealant of the bottle body (1), wherein the first bottle cap (3) completely surrounds the second bottle cap (8), and the second bottle cap (8) can slide within the first bottle cap (3); the sealant within the bottle body (1) is led out by combination of the sealant hose (2) and a connection tube of the sealant bottle passing through the second bottle cap (8);

the flexible sealant hose (4) is connected with a one-way valve at the flexible sealant hose's one end; the one-way valve includes a valve body (51), a sealing plug (53) and a valve cover (52), while the valve cover (52) is arranged at one end of the valve body (51) that is far away from the sealant hose (2); the valve body (51) is arranged with a channel and a groove for guiding the sealant (511) inside, wherein the groove for guiding the sealant (511) connected to the channel is arranged at one end of the channel that is far away from the valve cover (52); the sealing plug (53) is arranged in the channel and moves therein along the axial direction of the bottle body (1); the one-way valve is arranged with a gravitational shell (7) which surrounds the one-way valve, the channel has a length providing some moving space for the sealing plug (53) so as to eliminate a pressure change caused by at least one of expansion and contraction of air and the sealant;

wherein the gravitational shell (7) has a specific gravity greater than a specific gravity of the flexible sealant hose (2);

wherein the second bottle cap (8) comprises a bottle cap body (81) and a central channel (82) arranged at the centre of the bottle cap body (81); and wherein the central channel (82) is inserted into the opening for outputting sealant of the bottle body (1), the inner surface of the bottle cap body (81) is provided with internal threads, and the bottle cap body (81) is matched and connected with external threads provided at the opening for outputting sealant of the bottle body (1).

2. The sealant bottle for tire repair of vehicle of claim 1, wherein the connection tube of sealant bottle is comprised of a second tube section (42) arranged along the axial direction of the bottle body (1) and a first tube section (41) perpendicular to the second tube section (42); the second tube section (42) passes through the second bottle cap (8) and connects with the sealant hose (2).

3. The sealant bottle for tire repair of vehicle of claim 2, wherein the second tube section (42) of the connection tube of sealant bottle is provided with a retaining ring (43) for preventing the connection tube of sealant bottle from loosening towards the outside of the bottle body in the sliding process.

4. The sealant bottle for tire repair of vehicle of claim 1, wherein the gravitational shell (7) is in threaded connection with the one-way valve.

5. The sealant bottle for tire repair of vehicle of claim 1, wherein the gravitational shell (7) is connected with the sealant hose (2) by a joint nozzle (71) protruding from the end of the gravitational shell (7).

6. The sealant bottle for tire repair of vehicle of claim 4, wherein the gravitational shell (7) is connected with the sealant hose (2) by a joint nozzle (71) protruding from the end of the gravitational shell (7).

7. The sealant bottle for tire repair of vehicle of claim 1, wherein the inner diameter of the channel of the valve body (51) is equal to the outer diameter of the sealing plug (53).

8. The sealant bottle for tire repair of vehicle of claim 1, wherein an end plate of the valve cover (53) is provided with three projections (521); the projections (521) are inserted into the corresponding slots (512) at one end of the valve body (51) that is far away from the sealant hose (2), so that the valve cover (52) is connected with the valve body (51).

9. The sealant bottle for tire repair of vehicle of claim 1, wherein the bottle body (1) also comprises an air inlet end; an opening for inputting air at the air inlet end of the bottle body is provided with a bottle stopper (9), while a sealing washer is arranged between the bottle stopper (9) and the opening for inputting air so as to prevent the leakage of the sealant.

* * * * *